UNITED STATES PATENT OFFICE.

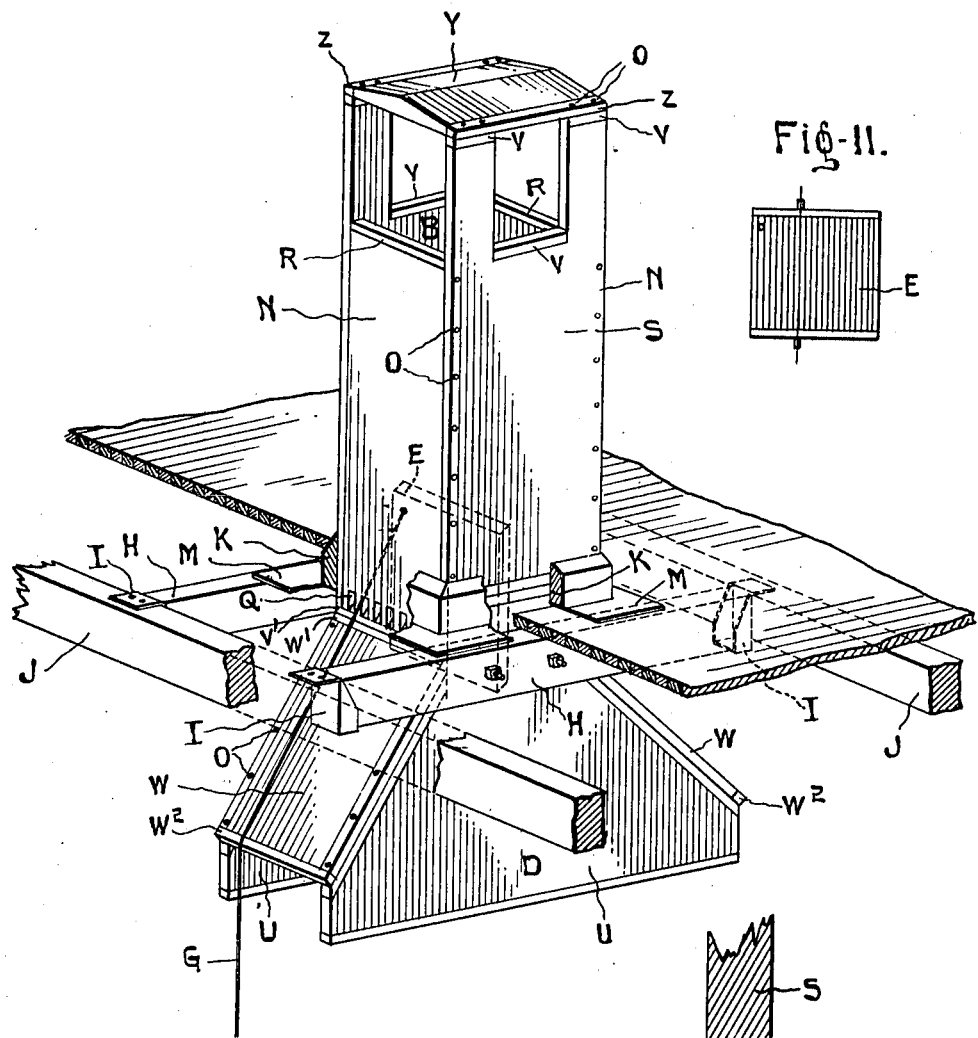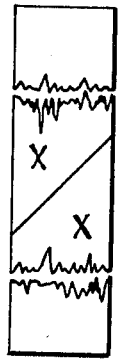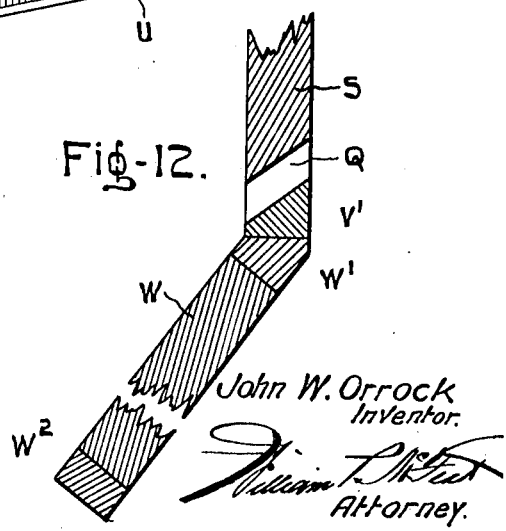

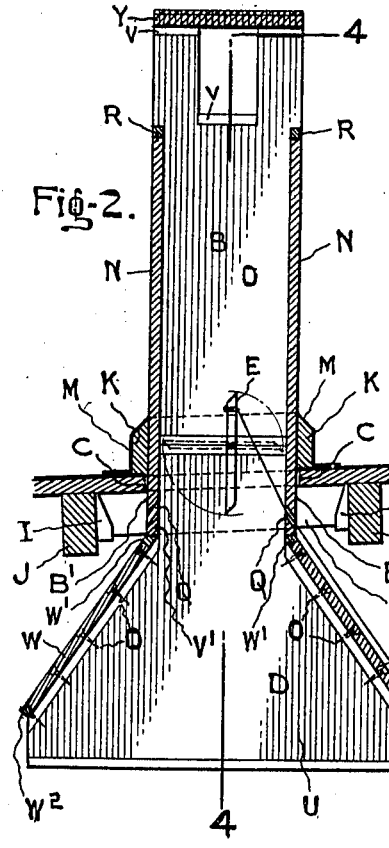
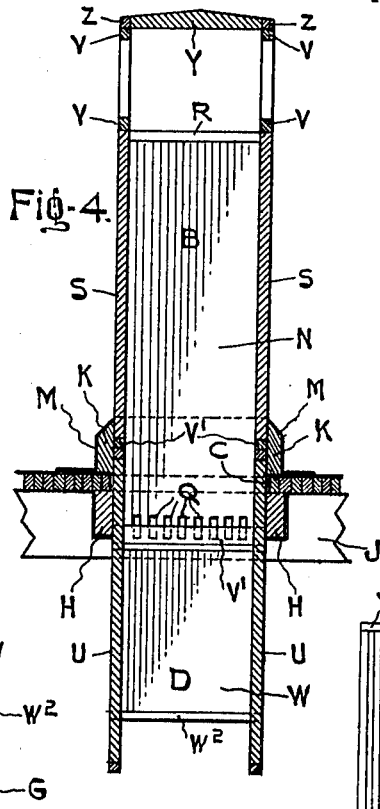
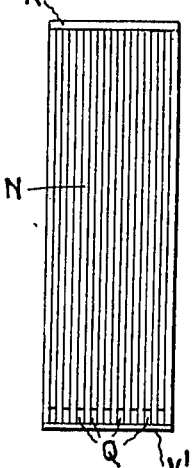
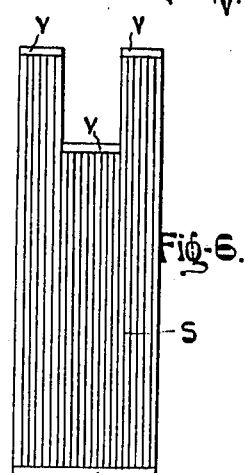
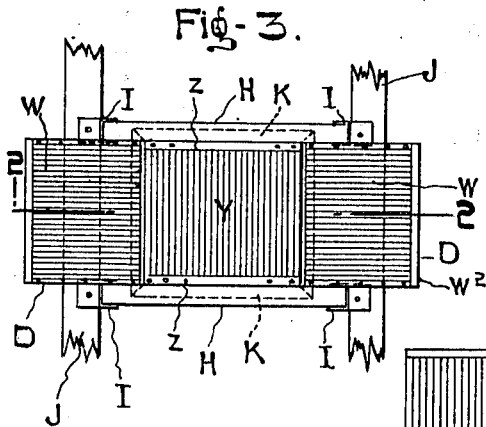
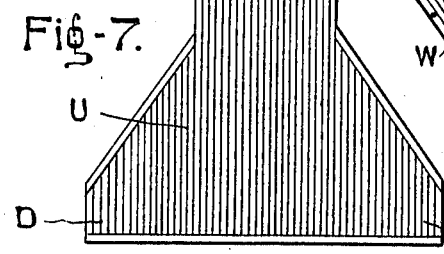
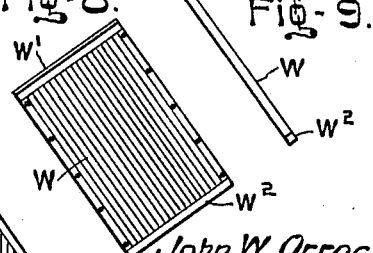

JOHN W. ORROCK, OF MONTREAL, QUEBEC, CANADA, ASSIGNOR TO JOHN MORRILL ROGER FAIRBAIRN, OF WESTMOUNT, QUEBEC, CANADA, FOR HIMSELF, AND IN TRUST FOR ROBERT W. McKILLOP, OF MONTREAL, CANADA, AND SAID ORROCK.

SMOKE-JACK.

1,314,016.   Specification of Letters Patent.   Patented Aug. 26, 1919.

Application filed April 24, 1919. Serial No. 292,419.

*To all whom it may concern:*

Be it known that I, JOHN W. ORROCK, a subject of the King of Great Britain, and resident of the city of Montreal, Province of Quebec, Dominion of Canada, have invented certain new and useful Improvements in Smoke-Jacks; and I do hereby declare that the following is a full, clear, and exact description thereof.

My invention relates to smoke jacks, and more particularly the smoke jack disclosed in my United States Patent No. 1,151,878 dated August 24, 1915, wherein is illustrated a wood mill-type smoke jack of laminated structure.

The present invention has for its object to increase the sphere of usefulness of this type of jack by constructing the same in knockdown form and at the same time providing in it means for carrying off smoke which has heretofore been pocketed within the roundhouse in the angles between the roof and the jack.

To this end the invention may be said briefly to consist of a wood mill-type smoke jack of knock-down form the members of which are reinforced to facilitate handling during shipment and while being assembled from knock-down state. Another feature consists of a particular construction of the laminæ of the members whereby vent holes are provided leading into the jack from the spaces surrounding the latter and immediately beneath the roof of the roundhouse. The jack consists essentially, similarly to the jack patented by me as above mentioned, of a straight flue of square cross section with a hood forming its lower end and expanded in the direction of the railroad track, the flue projecting upwardly through the roof. This jack, according to my invention, is secured in position by having its flue projecting upwardly through the roof, as just mentioned, and a collar is rigidly secured to this flue in position to bear upon the top of the roof and support the jack, and although I describe hereinafter certain trimmers and beams securing the flue and hood at the underside of the roof, yet these last mentioned structural members are purely for initial positioning of the jack and may be dispensed with after the supporting collar has been secured in place. The flue according to my present invention is made up of two pairs of side members all of the same length and so assembled that the upper ends of one pair project above the other pair and the lower ends of this other pair project below the first mentioned pair, and the hood consists of two vertical and two oblique members. The upper ends of the vertical side members being straight and equal in width to the members of the flue and forming a continuation of two of the sides thereof, and lower ends of these side members of the hood are expanded. The other sides of the hood are oblique members forming the tops of the expanded portion of the hood. These members from which the complete jack is formed are adapted to be shipped in a knocked-down state from a central point of fabrication to any place along the line and there assembled. If desired they may be assembled in flue and hood sections for shipment, the particular construction and arrangement of the members permitting of this. The invention also consists of the specific construction and particular arrangement of parts of my improved jack as hereinafter described and pointed out in the claims.

For full comprehension, however, of my invention, reference must be had to the accompanying drawings in which similar reference characters indicate the same parts, and wherein:

Figure 1 is an isometric view of my improved jack with the roof of the roundhouse omitted and parts of the jack broken away for purposes of illustration;

Fig. 2 is a longitudinal vertical sectional view of the jack taken on line 2—2 Fig. 3;

Fig. 3 is a plan view of the jack;

Fig. 4 is a transverse vertical sectional view taken on line 4—4 Fig. 2;

Fig. 5 is a plan view of one of the side pieces of the jack, two of which are required;

Fig. 6 is a plan view of the other side, two of which are required;

Fig. 7 is a plan view of the side of the hood corresponding to the side illustrated in Fig. 6, two of which are required;

Fig. 8 is a plan view of one of the two top pieces of the hood;

Fig. 9 is an edge view thereof;

Fig. 10 is a plan view of the cap of the jack;

Fig. 11 is a plan view of a damper for the jack;

Fig. 12 is a detail view of the angle of the flue of the jack with its hood, and illustrating particularly the vent holes; and Fig. 13 is a detail view illustrating the manner in which I cut the pieces for the corners of the hood.

The flue section of my improved jack is indicated at B and is supported in an opening C in the roof of the round house with its lower end projecting a short distance below the roof as at $B^1$; while the hood section is expanded in the direction of the track as at D; the flue portion having a damper E (Fig. 11) pivoted therein. The pivot of the damper is off-centered and a rope G for operating it is connected to its short end in order that by pulling the rope the damper may be closed and will open by gravity when released.

The jack is supported by means of a pair of trimmers H, supported in turn by metal hangers I of angular form secured to the ends thereof, and to cross beams J, a collar K being nailed to the jack around the same in the angle between it and the outside surface of the roof, this collar and the adjacent portion of the roof being covered by a galvanized iron flashing M.

The flue consists of a pair of side members N (Fig. 5) made up of a series of long narrow flat pieces or laminæ nailed together side by side, the alternate pieces having their lower ends cut off obliquely to present vent holes Q. In order to reinforce these members the top edges having transverse strips R, nailed to them. These side members extend from the lower end of the flue portion to its top.

The other sides of the flue consists of oblong members S (Fig. 6) and the upper ends T of the members U forming the straight sides to the hood, these sides S being so assembled with the sides N that the ends of the latter project above and below the sides S. These members S are also constructed of a series of long narrow flat pieces or laminæ nailed together side by side reinforced by end strips V and $V^1$.

The oblique pieces W for the top of the hood are comparatively short and oblong in plan view, each made up of similar strips or laminæ as used for the other pieces of the jack and arranged longitudinally with transverse strips $W^1$ $W^2$ at their ends, and the strips, both longitudinal and transverse, are nailed securely together. The transverse strips $W^1$ and $V^1$ are cut to match as shown in enlarged detail in Fig. 12.

In order to facilitate assembling these members, a number of corner pieces X of rectangular-triangular form, are supplied to complete the corners of the hood. These corner pieces are illustrated in detail in Figs. 12 and 13 and form the end marginal strips of the side of the flue.

The members are secured together at their edges by wood screw O, the heads of which are countersunk and covered with plastic cement.

The cap of the jack consists of a single member Y made up like the other members of the jack of a number of long narrow strips or laminæ nailed individually side by side and reinforced by transverse end pieces Z, these transverse pieces Z having a pair of screw holes 5 near each and through which the cap is secured to the upper ends of the members or sides N.

The jack is located as above mentioned in the hole C in the roof of the engine house with the lower portion of the flue body extending sufficiently below the roof to accommodate the damper E, and an operating rope G extends therefrom through one of the vent holes Q, and hangs down over one end of the hood.

The jack, it will be observed, is of a knockdown nature without frames, cleats or bracing, and presents practically smooth walls both inside and out, which provide minimum projections for the collection of soot and other deposits of smoke fumes. The members being individually constructed of strips of timber or laminæ nailed together are very strong and capable of withstanding considerable handling, and consequently are well adapted for shipment and assembling. Another important feature is the ventilating property presented by the vent holes Q whereby the smoke which may escape the hood is sucked into the jack from the space surrounding the portion of the latter extending below the roof. By referring to Fig. 12 it will be seen that these vent holes slope to the same angle as the hood, and thus induce an up-draft and prevent downdraft. The jack should be assembled in the shop before the members are shipped to insure a correct fit. After the shop work is completed each member should be submerged in and soaked with a fire resisting paint in order that it may be thoroughly permeated with the paint; or if preferred each piece or stick may be dipped before the members are fabricated, and allowed to drip and dry before the members are made up.

If desired the flue and hood sections may be individually permanently assembled for shipment and erection at their destination, the interlocking of the upper ends T of the side members of the hood with the downwardly projecting ends of the members N facilitating the erection.

Although I have described and illustrated my invention applied to engine housings, yet if desired it may be applied to any building requiring a smoke stack.

What I claim is as follows:

1. The combination with the roof of a building, such roof having an opening; of a knock-down smoke-jack, comprising members fashioned to present two pairs of opposite sides forming a straight flue of rectangular cross-section and a hood at the lower end of the said flue and consisting of members fashioned to present a pair of vertical downwardly expanded sides and two oblique sides forming the tops of the said expanded portion, means securing the jack to the roof with the flue projecting through the opening in the latter; and the said smoke-jack having vent holes effecting communication between the interior of the flue and the space beneath and in the vicinity of the roof.

2. The combination with the roof of a building, such roof having an opening; of a knock-down smoke-jack comprising members fashioned to present two pairs of opposite sides forming a straight flue of rectangular cross-section, all the sides of which are of equal length, one pair being disposed to project above the other two and the lower ends of the said other sides projecting below the first mentioned pair; a hood at the lower end of the said flue and consisting of members fashioned to present a pair of vertical downwardly expanded sides with diminished straight upper ends adapted to fit between the downwardly projecting sides of the flue, means securing the jack to the roof with the flue projecting through the opening in the latter; and the jack having vent holes effecting communication between the space beneath and in the vicinity of the roof.

3. The combination with the roof of a building, such roof having an opening therein; of a knock-down smoke jack comprising members fashioned to present two pairs of opposite sides forming a straight flue of rectangular cross-section; a hood at the lower end of the flue and consisting of members fashioned to present a pair of vertical downwardly expanded sides and two oblique sides forming the tops of the said expanded portion of the hood; means securing the jack to the top of the roof with the flue projecting through the opening in the latter; each of the said members consisting of long narrow strips fastened together sidewise and two of the opposite sides of the flue having the lower ends of their alternate strips shortened to provide vent holes effecting communication between the space beneath and in the vicinity of the roof and the interior of the flue.

4. The combination with the roof of a building such roof having an opening therein; of a knock-down smoke-jack comprising members fashioned to present two pairs of opposite sides forming a straight flue of a rectangular cross-section; a hood at the lower end of the said flue and consisting of members fashioned to present a pair of vertical downwardly expanded sides and two oblique sides forming the tops of the expanded portion of the hood; means securing the smoke-jack to the roof with the flue projecting through the said opening; said smoke-jack having vent holes effecting communication between the space beneath and in the vicinity of the roof, and said vent holes being oblique and of corresponding angle to the oblique sides of the hood.

5. The combination with the roof of a building, such roof having an opening therein; of a knock-down smoke-jack comprising members fashioned to present two pairs of opposite sides forming a straight flue of rectangular cross-section; a hood at the lower end of the said flue and consisting of members fashioned to present a pair of vertical downwardly expanded sides and two oblique sides forming the tops of the said expanded portion of the hood; means securing the smoke-jack to the roof with the flue projecting through the said opening; each of the said members consisting of long narrow strips fastened together sidewise, and two of the opposite sides of the flue having the lower ends of their alternate strips shortened to provide vent holes effecting communication between the space beneath and in the vicinity of the roof and the interior of the flue, said vent holes being oblique and of corresponding angle to the oblique sides of the hood.

6. The combination with the roof of a building, such roof having an opening therein; of a knock-down smoke-jack comprising members fashioned to present two pairs of opposite sides forming a straight flue of rectangular cross-section, all of the sides of which are of equal length, one pair being disposed to project above the other two, and the lower ends of the other sides projecting below the first mentioned pair; a hood at the lower end of the said flue and consisting of members fashioned to present a pair of vertical downwardly expanded sides with diminished straight upper ends adapted to fit between the downwardly projecting sides of the flue, means securing the smoke-jack to the roof with the flue projecting through the said opening, said flue having vent holes effecting communication between the space beneath and in the vicinity of the roof and the interior of the flue and the portion of the sides projecting above the other sides having openings therein, and a cap supported upon said upwardly projecting portions.

7. The combination with the roof of a building, such roof having an opening therein; of a knock-down smoke-jack comprising members fashioned to present two pairs of opposite sides forming a straight flue of rectangular cross-section, all of the sides of which are of equal length, one pair being disposed to project above the other two sides and the lower ends of the said other sides projecting below the first mentioned pair; a hood at the lower end of the said flue and consisting of members fashioned to present a pair of vertical downwardly expanded sides with diminished straight upper ends adapted to fit between the downwardly projecting sides of the flue; means securing the smoke-jack to the roof with the flue projecting through the said opening; each of the said members consisting of long narrow strips fastened together sidewise and the sides of the flue of greater length having the lower ends of their alternate strips shortened to provide the vent holes effecting communication between the space beneath and in the vicinity of the roof and the interior of the flue.

8. The combination with the roof of a building, said roof having an opening therein; of a knock-down smoke-jack comprising members fashioned to present two pairs of opposite sides forming a straight flue of rectangular cross-section, all of the sides of which are of equal length, one pair being disposed to project above the other two sides, and the lower ends of the said other sides projecting below the first mentioned pair; a hood at the lower end of the said flue and consisting of members fashioned to present a pair of vertical downwardly expanded sides with diminished straight upper ends adapted to fit between the downwardly projecting sides of the flue; means securing the smoke-jack to the roof with the flue projecting through said opening, each of the said members consisting of long narrow strips fastened together sidewise and the sides of the flue of greater length having the lower ends of their alternate strips shortened to provide vent holes effecting communication between the space beneath and in the vicinity of the roof and the interior of the flue; said vent holes being oblique and of corresponding angle to the oblique sides of the hood.

9. The combination with the roof of a building, said roof having an opening therein; of a knock-down smoke-jack, comprising members fashioned to present two pairs of opposite sides forming a straight flue of rectangular cross-section; a hood at the lower end of the said flue and consisting of members fashioned to present a pair of vertical downwardly expanded sides and two oblique sides forming the tops of the said expanded hood portion; means for securing the smoke-jack to the roof with the flue projecting through said opening, the said flue having vent holes effecting communication between the interior of the flue and the space beneath and adjacent to the roof; the said smoke-jack being disposed with the lower end of its flue portion projecting below the roof and containing a damper located above the vent holes; and means for operating the damper.

10. The combination with the roof of a building, said roof having an opening therein; of a knock-down smoke-jack comprising members fashioned to present two pairs of opposite sides forming a straight flue of rectangular cross-section; a hood at the lower end of the flue and consisting of members fashioned to present a pair of vertical downwardly expanded sides; and two oblique sides forming the tops of the said expanded hood portion; means securing the smoke-jack to the roof with the flue projecting through the said opening; the sides of the flue immediately above the oblique sides having vent holes effecting communication between the interior of the smoke-jack and the space beneath and in the vicinity of the roof; the said smoke-jack being disposed with the lower end of its flue projecting below the roof and containing an off-centered pivoted damper located above the vent holes; and a rope for operating the damper and connected at one end to the short end of the damper and passing through one of the vent holes and hanging down over the end of the hood.

11. A knock-down smoke-jack consisting of separate flue and hood sections, the flue section having downwardly projecting sides and the hood section having upwardly projecting side portions adapted to engage between the downwardly projecting sides of the flue-section for the purpose set forth.

12. A knock-down smoke-jack consisting of separate flue and hood sections, the flue section having downwardly projecting sides and the hood section having upwardly projecting side portions adapted to engage between the downwardly projecting sides of the flue-section for the purpose set forth, each of the sides of said sections being vertically laminated.

13. The combination with the roof of a building having an opening; of a laminated smoke-jack mounted within said opening and projecting above and below the roof, said smoke-jack having vent holes contiguous to the roof and in the portion of the jack below the roof for effecting communication between the interior of the flue and the space beneath and in the vicinity of the roof.

In testimony whereof I have signed my name to this specification in the presence of two witnesses.

JOHN W. ORROCK.

Witnesses:
J. FINCH,
F. W. DUCKETT.